(12) United States Patent
Karakawa et al.

(10) Patent No.: US 7,397,737 B2
(45) Date of Patent: Jul. 8, 2008

(54) OUTPUT ADJUSTMENT METHOD FOR LENS POSITION SENSOR OF OPTICAL DISK DEVICE AND OPTICAL DISK DEVICE THEREOF

(75) Inventors: Yuji Karakawa, Kawasaki (JP); Toru Ikeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 540 days.

(21) Appl. No.: 10/977,018

(22) Filed: Oct. 29, 2004

(65) Prior Publication Data

US 2005/0226109 A1    Oct. 13, 2005

(30) Foreign Application Priority Data

Mar. 30, 2004    (JP)    ............... 2004-098718

(51) Int. Cl.
*G11B 7/00*    (2006.01)
(52) U.S. Cl. ............... 369/44.32; 369/53.28; 369/44.29
(58) Field of Classification Search ............. 369/44.32, 369/53.28, 44.29
See application file for complete search history.

(56) References Cited

U.S. PATENT DOCUMENTS

| | | | | |
|---|---|---|---|---|
| 5,347,503 A | * | 9/1994 | Koyama et al. | ........... 369/44.32 |
| 5,532,990 A | * | 7/1996 | Koyama et al. | ........... 369/44.32 |
| 5,623,464 A | | 4/1997 | Tani et al. | |
| 6,433,329 B1 | * | 8/2002 | Butka et al. | ................. 250/221 |
| 6,529,455 B1 | * | 3/2003 | Okajima et al. | ........... 369/44.25 |
| 2003/0137907 A1 | * | 7/2003 | Kitayama et al. | ........ 369/44.32 |

FOREIGN PATENT DOCUMENTS

| | | |
|---|---|---|
| EP | 0 503 096 A1 | 9/1992 |
| GB | 2191880 A * | 12/1987 |
| JP | 5-298728 | 11/1993 |
| JP | 7-235064 | 9/1995 |
| JP | 11-154336 | 6/1999 |

* cited by examiner

*Primary Examiner*—Wayne Young
*Assistant Examiner*—LaTanya Bibbins
(74) *Attorney, Agent, or Firm*—Greer, Burns & Crain, Ltd.

(57) ABSTRACT

A position sensor detects a position of an objective lens for irradiating light onto an optical disk. An output adjustment of the position sensor is used for correcting characteristics change due the change with the passage of time. The position of an objective lens and the output of a position sensor are measured at a reference time, the ratio at the neutral point is determined in advance, and when the device is used, the position of the objective lens and the output of the position sensor are measured. The output level at the neutral point during using the device is calculated from the measurement result and the ratio at the neutral point.

18 Claims, 19 Drawing Sheets

OUTPUT ADJUSTMENT METHOD FOR LENS POSITION SENSOR OF OPTICAL DISK DEVICE AND OPTICAL DISK DEVICE THEREOF

BACKGROUND OF THE INVENTION

1. Field of the Invention

The present invention relates to an output adjustment method for a lens position sensor of an optical disk device for adjusting the output of the lens position sensor that detects a position of an object lens of the optical head, and the optical disk device, and more particularly to an output adjustment method for a lens position sensor of an optical disk device that detects a neutral point accurately even if the output of the lens position sensor changes due to the change with the passage time of the lens position sensor, and the optical disk device thereof.

2. Description of the Related Art

Because of advancements in optical storage technology, optical disk devices using optical storage disks are widely used for compact disk (CD) devices, DVD (Digital Versatile Disk) devices, magneto-optical (MO) disk drives and others.

As FIG. 21 shows, in such an optical disk device, light is irradiated from an optical head 2000 onto an optical disk 1000, and a reflected light thereof is received by an optical detector 2030 for reading. And the focus position shift FES of the irradiated light and the track position shift TES are also detected from the reflected light.

In other words, spiral or concentric tracks have been formed on the optical disk 1000, and it is effective for fine reading and writing to focus the irradiated light on the recording face of the disk and position the light to the track position of the disk.

For this, the focus control mechanism for controlling the focus of the objective lens 2010 of the optical head 2000, according to the detected focus position shift and the track control mechanism 2020 for controlling the objective lens 2010 to position the track position, according to the detected track position shift, are provided.

To control the lens position, the lens position sensor 2040 is installed on the lens 2010, and the signal LPOS, according to the displacement of the lens 2010, is acquired from the lens position sensor 2040, and the lens position is controlled based on the signal LPOS.

The lens position signal LPOS is used for locking so that the lens 2010 does not sway during seeking, and for removing the offset of the track position shift (error) signal.

As FIG. 23 shows, when the positional relationship of the optical head 2000 and the objective lens 2010 is not shifted, the relationship of the TES amplitude waveform and tracking position is expressed by a TES amplitude waveform having a symmetric sine wave of which center is the zero level (tracking position) indicated by the straight line. Since the center position of the TES waveform is exactly at the tracking position, a fine track servo can be implemented.

If the positional relationship between the optical head 2000 and lens 2010 shifts, however, offset is generated in the TES amplitude., and a shift occurs, as shown in FIG. 24. In the case of FIG. 24, the track servo is executed at the edge of the TES waveform, which makes the track servo unstable.

In this way, when the positional relationship of the optical head 2000 and lens 2010 shifts, this must be corrected, so the lens position is detected by the above mentioned lens position signal LPOS, and the offset of TES is corrected.

In this method of detecting the lens position, an error may be generated due to the change of the passage time and contamination of the sensor 2040, for example. In other words, as FIG. 22 shows, the lens shift amount and the output of the lens position sensor changes due to the change of the passage time, which makes it difficult to cancel the offset accurately.

To correct this change of output, a differential detection type has been proposed, where a pair of light receiving sections are provided to the lens position sensor 2040, so as to obtain the difference between the outputs of the pair of light receiving sections (e.g. Japanese Patent Application Laid-Open No. 7-235064).

A magneto-optical disk device, which is a type of optical disk device, is often used as a stationary type, so the position of the device rarely changes. However today magneto-optical disks are becoming compact, and are seen used in portable equipment fields. And if used as portable equipment, the attitude of the device when used is unknown.

If the attitude changes, the objective lens, which is supported such that moving in the track position is possible, tends to cause a position shift between the lens position and optical head, due to gravity and other influences, and the amount of shift tends to increase.

If the differential detection type in prior art is used for correcting this, a pair of detection sections and a differential circuit must be installed, so it is not preferable to decrease cost and size for portable equipment, since the number of components increases and mechanical components become complicated.

Also considering the change of the passage time, the characteristics of the initial status change because the light intensity of the LED section of the sensor changes, or the light receiving sensitivity of the sensor changes due to dust which attaches to the detector section, for example. Therefore, if a pair of light receiving sections is installed, they do not always deteriorate in the same way, even if the differential type is used, and correction of the change of output may be difficult in some cases.

SUMMARY OF THE INVENTION

With the foregoing in view, it is an object of the present invention to provide an output adjustment method for a lens position sensor of an optical disk device for correcting the output characteristics change due to the change with passage of time, even if a lens position sensor with a simple configuration is used, and the optical disk device thereof.

It is another object of the present invention to provide an output adjustment method for a lens position sensor of an optical disk device for correcting the output characteristics change due to the change with passage of time, even if a lens position sensor with a simple configuration is used, and for implementing a compact device at low cost, and the optical disk device thereof.

It is still another object of the present invention to provide an output adjustment method for a lens position sensor of an optical disk device for accurately correcting the output characteristics change due to the change with passage of time, even if a lens position sensor with a simple configuration is used, and the optical disk device thereof.

To achieve these objects, an output adjustment method for a lens position sensor of an optical disk device for detecting the position of an objective lens, that can move in a track direction of the optical disk, by a position sensor, has steps of: measuring the output of the position sensor when the objective lens is at a neutral point and the output of the position sensor when the objective lens shifts to left and right movable limit positions at a reference time; calculating an output ratio at the neutral point to be a reference from the measured outputs; measuring the output of the position sensor when the objective lens shifts to left and right movable limit positions during usage of the device; and calculating the output level of the position sensor corresponding to the neutral point from the measured outputs and the calculated output ratio at the neutral point.

An optical disk device for at least reading an optical disk by moving an optical head having an objective lens, that can move in a track direction of the optical disk, has a position sensor installed in the optical head for detecting a position of the objective lens, and a control unit for controlling the optical head according to the output of the position sensor. And the control unit measures the output of the position sensor when the objective lens is at a neutral point and the output of the position sensor when the object lens shifts to left and right movable limit positions at a reference time, calculates and stores the output ratio of the neutral point to be a reference from the measured outputs, measures the output of the position sensor when the objective lens shifts to left and right movable limit positions during usage of the device, and calculates the output level of the position sensor corresponding to the neutral point from the measured outputs and the calculated output ratio at the neutral point.

In the present invention, it is preferable that the measurement step has a step of measuring the output of the position sensor when the objective lens abuts against left and right lens covers for limiting the movable range of the objective lens.

In the present invention, it is preferable that the measurement step has a step of monitoring the output of the position sensor while moving the objective lens, and a step of detecting the fact that the objective lens has abutted against the left and right lens covers for limiting the movable range of the objective lens by the monitoring result.

In the present invention, it is preferable that the measurement step has a step of measuring the output of the position sensor with the focus adjustment position of the objective lens secured.

In the present invention, it is preferable that the measurement step has a step of measuring the output of the position sensor with the objective lens positioned at the inner track position of the optical disk.

In the present invention, it is preferable that the measurement step at the reference time has a step of measuring the output of the position sensor with the optical disk device placed in a horizontal status.

In the present invention, it is preferable that the measurement step, during usage of the device, is executed when the optical disk is inserted into the optical device.

In the present invention, it is preferable that the measurement step has a step of shifting the objective lens to the movable limit position of the objective lens with driving a track actuator for shifting the objective lens.

In the present invention, it is preferable that the measurement step, during usage of the device, is executed when at least either the fact that a predetermined time has elapsed or the fact that the environmental temperature has changed is detected.

According to the present invention, the neutral point level of the objective lens can be adjusted even if a lens position sensor with a simple configuration is used, so the lens position can be detected stably for the change with passage of time, and a compact optical disk device can be implemented at low cost using a lens position sensor with a simple configuration.

DESCRIPTION OF THE PREFERRED EMBODIMENTS

Embodiments of the present invention will now be described in the sequence of the optical disk device, neutral point level adjustment method, neutral point level adjustment process, and other embodiments, but the present invention is not limited to these embodiments.

Optical Disk Device

Figure 1:
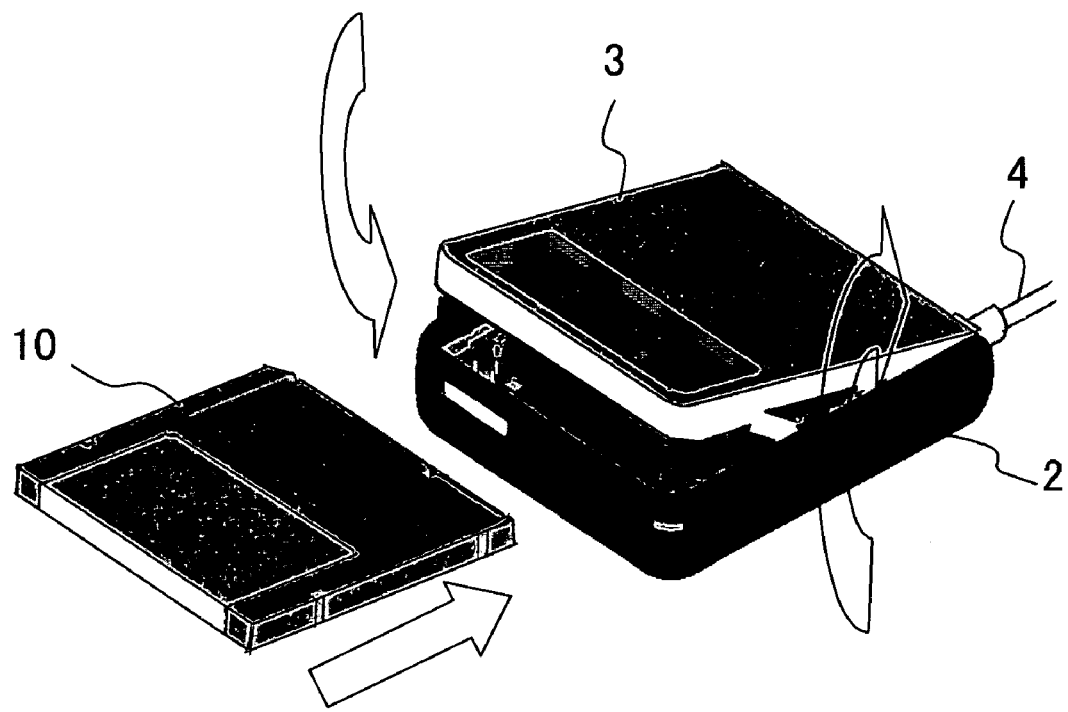
FIG. 1 is an external view of the optical disk device according to an embodiment of the present invention.
Figure 2:
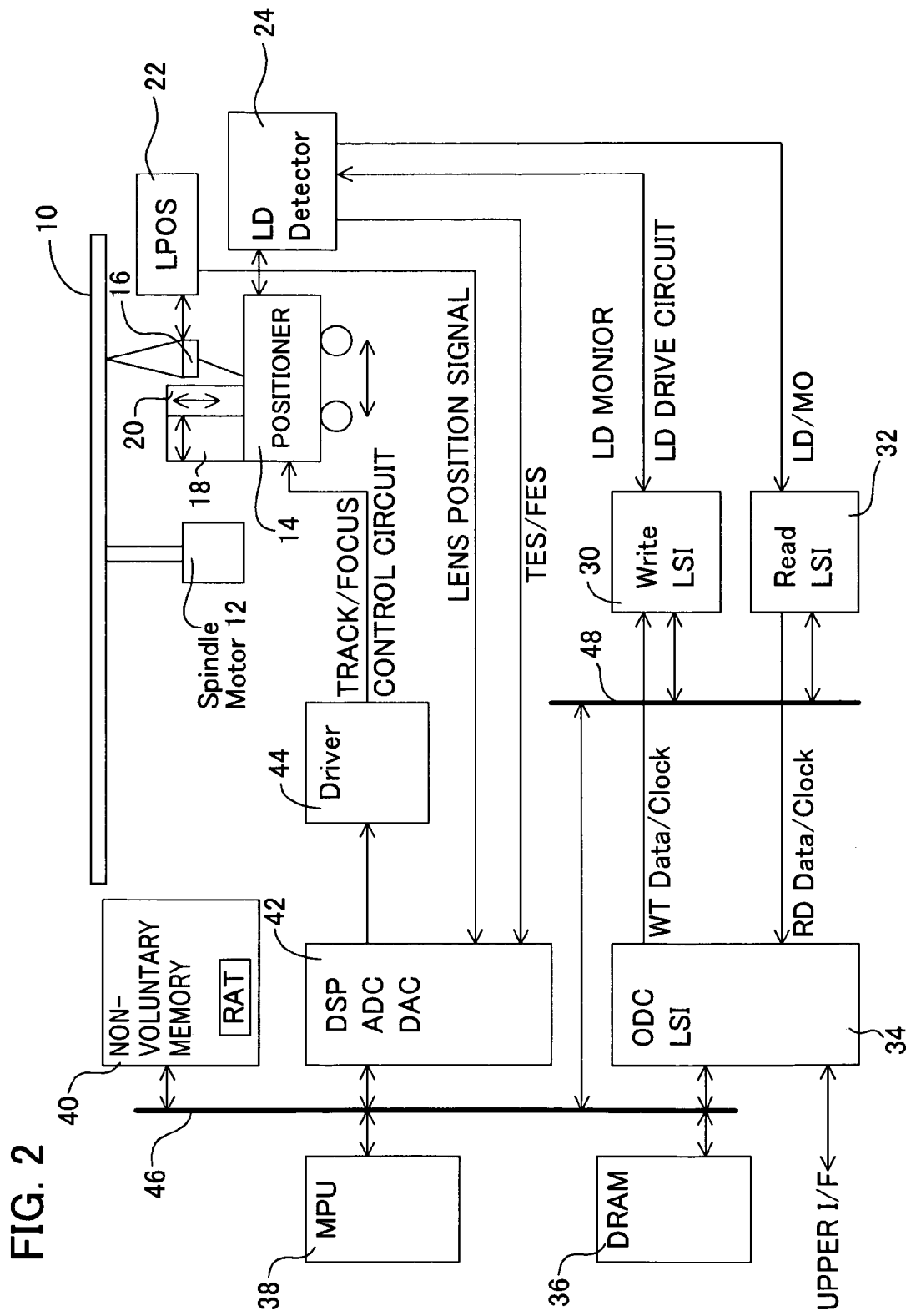
FIG. 2 is a block diagram depicting the optical disk device according to an embodiment of the present invention.
Figure 3:
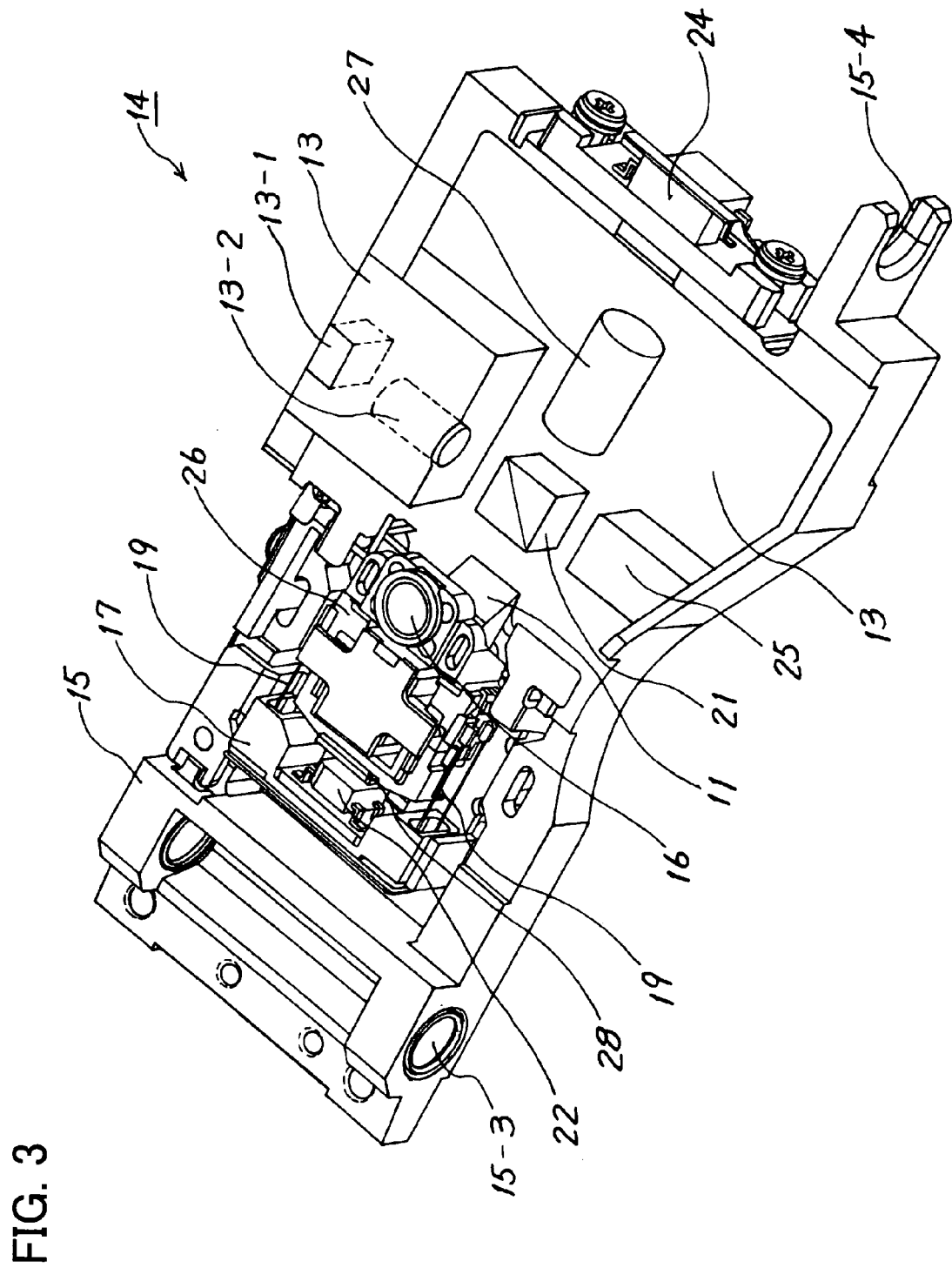
FIG. 3 is a diagram depicting the configuration of the optical head in FIG. 2.
Figure 4:
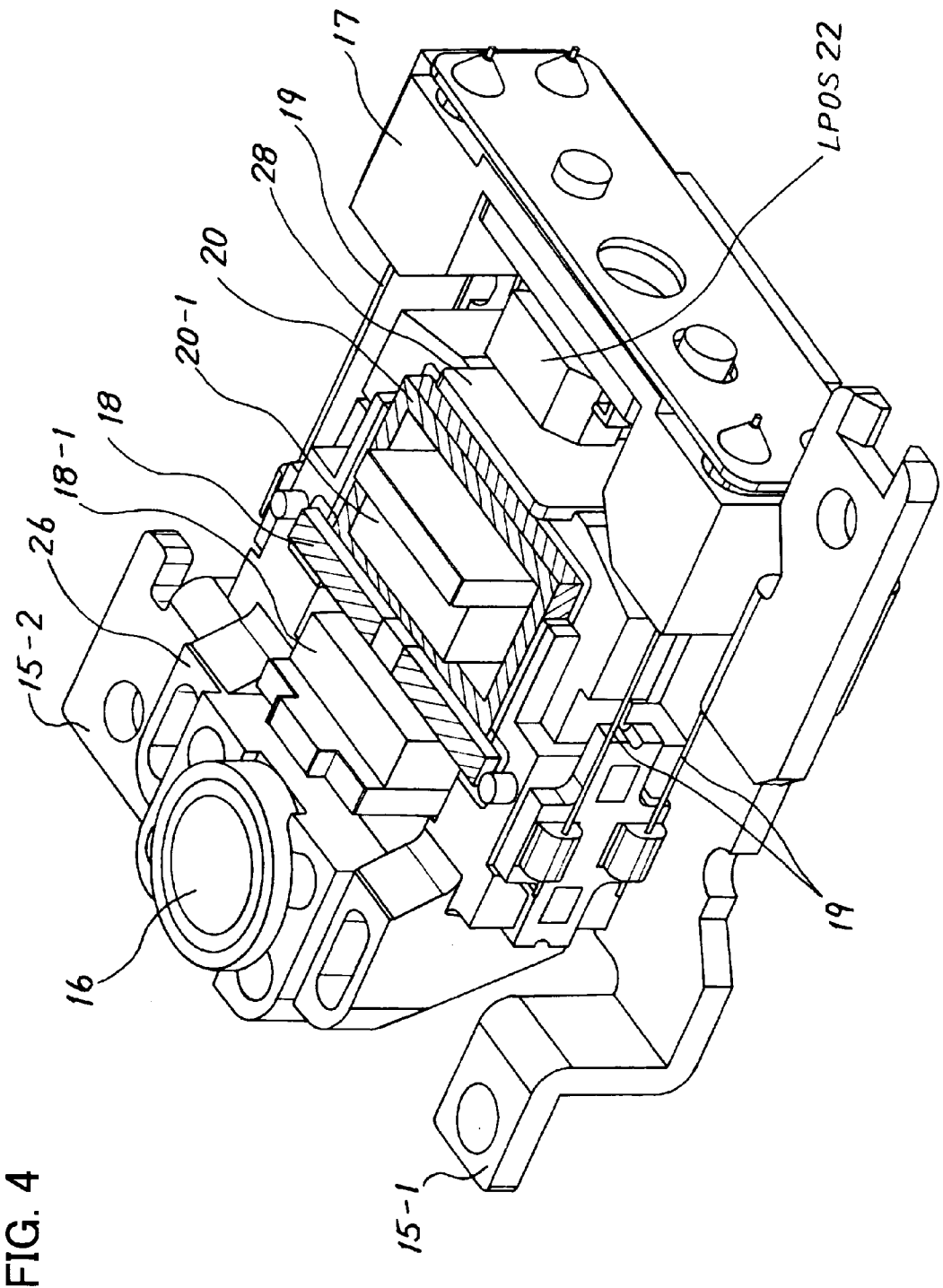
FIG. 4 is a diagram depicting a partial configuration of the optical head in FIG. 3.
Figure 5:
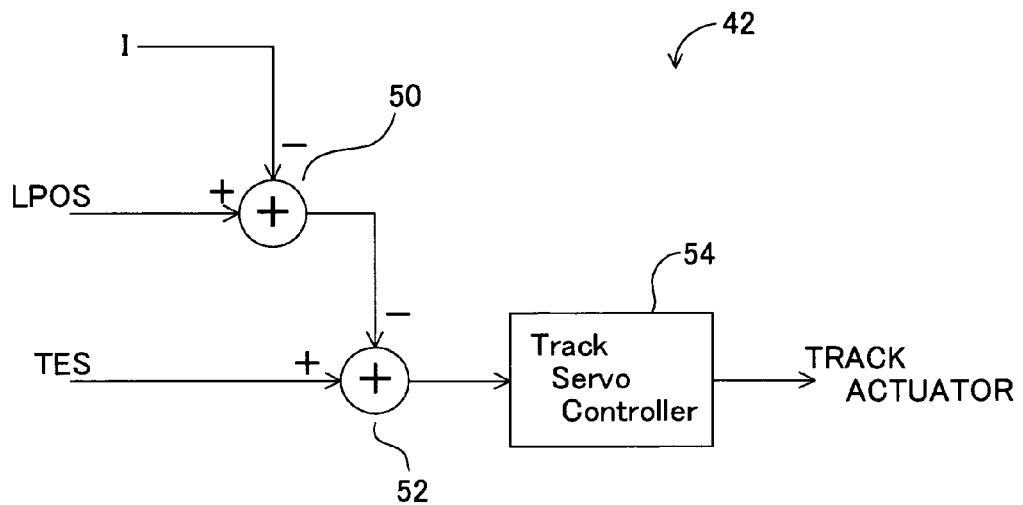
FIG. 5 is a diagram depicting the track servo control mechanism in FIG. 2.

FIG. 1 is an external view of an embodiment of the optical disk device of the present invention, FIG. 2 is a block diagram depicting the optical disk device in FIG. 1, FIG. 3 is a diagram depicting the optical head in FIG. 2, FIG. 4 is a partial enlarged view of FIG. 3, and FIG. 5 is a diagram depicting the track servo control mechanism in FIG. 2.

FIG. 1 shows a portable type magneto-optical disk device as an optical disk device. The magneto-optical disk device 1 is comprised of a device main body 2, and a cover 3, and the cover 3 is opened as shown in FIG. 1 when the magneto-optical disk cartridge 10 is inserted, then the cover 3 is closed.

This magneto-optical disk cartridge 10 is, for example, a 3.5 inch disk. Since the device 1 uses an open shell type loading mechanism, a compact and light-weight device can be implemented. For example, the device 1 has a size almost the same as the size of the disk 10, which is suitable for portable use. This device 1 is connected to the host, such as a personal computer, by the USB (Universal Serial Bus) cable 4. And the device 1 is driven by USB bus power or a battery.

FIG. 2 is a block diagram depicting the optical disk device in FIG. 1. The spindle motor 12 rotates the magneto-optical disk (hereafter called MO) 10. The optical head 14 moves in the radius direction of the MO 10 by the actuator, such as a step motor, which is not illustrated.

As mentioned later in FIG. 3 and FIG. 4, the optical head 14 is comprised of a objective lens 16, a focus actuator 20 for driving the objective lens 16 in the focus direction (vertical direction in the drawings), a track actuator 18 for driving the objective lens 16 in the track direction (horizontal direction in the drawings), a laser diode which is a light emitting source, a photo-detector 24, and a lens position sensor 22 for detecting the position of the objective lens 16.

A write circuit (LSI) 30 changes the laser diode (LD) drive current according to read/write/erase, and modules the LD drive current by the write data during writing. The write circuit 30 also monitors the output of the laser diode, and performs APC (Auto Power Control).

A read circuit (LSI) 32 identifies a ID signal from the output of the photo-detector 24, and adjusts the MO signal (read data) to be the data format. A ODC (Optical Drive Controller) circuit (LSI) 34 performs the host interface control, and also controls the synchronization of the write data/read data between the host and the write/read circuits 30 and 32 using RAM (Random Access Memory) 36.

A MPU (Micro Processor Unit) 38 is for controlling the entire device, and performs level adjustment processing at the neutral point of the lens position sensor 22 in the present embodiment. A non-volatile memory 40 stores the programs and data required for processing by the MPU 38, and stores the ratio RAT of the measured neutral point level.

A DSP (Digital Signal Processor) 42 is for performing servo control for the step motor, the spindle motor 12, the track actuator 18 and the focus actuator 20, and performs focus servo control according to the focus error signal FES from the photo-detector 24, and controls the focus actuator 20 via the driver 44.

The DSP 42 also performs track servo control according to the track error signal TES from the photo-detector 24 and the LPOS signal of the lens position sensor 22, and controls the track actuator 18 via the driver 44.

A main bus 46 connects the MPU 38, RAM 36, ODC 34, DSP 42 and non-volatile memory 40. A sub-bus 48 connects the MPU 38, write circuit 30 and read circuit 32.

Now the optical head 14 will be described with reference to FIG. 3 and FIG. 4. A base of the optical head 14 is constructed by the housing 15, and has a pair of sleeves 15-3 and 15-4 at the top and bottom ends in FIG. 3, supported by a pair of moving guides (not illustrated).

The optical system is installed at the right side in FIG. 3, and the optical drive system is installed at the left. Now the optical system will be described. On the laser diode (light source) unit, the laser diode 13-1 and collimator lens 13-2 are installed. The light from the laser diode 13-1 is converted into parallel light by the collimator lens 13-2, is reflected by the beam splitter 21, enters the objective lens 16 via the rise mirror 11, and irradiates onto the MO 10 via the objective lens 16.

The photo-detector 25 for APC receives light of the laser diode 13-1 via the beam splitter 21, and outputs the LD monitor current to the write circuit 30 in FIG. 2.

The reflected light from the MO 10, on the other hand, enters the objective lens 16 and enters the photo-detector 24 via the rise mirror 11, beam splitter 21 and lens unit 27. The photo-detector 24 is comprised of known four-division detectors, and outputs the focus error signal FES, track error signal TES and full signal MO based on a known operation.

Now the optical drive system in the enlarged view in FIG. 4 will be described with reference to FIG. 3. In an actuator assembly 17 installed in the housing 15, the magnet 18-1 of the track actuator 18, the magnet 20-1 of the focus actuator 20 and the lens position sensor 22 are disposed.

Both sides of the lens support block 26 for supporting the objective lens 16 are connected to the actuator assembly 17 by a pair of plate springs 19. Therefore the lens support block 26 is supported to the actuator assembly 17 so as to able to rock in the focus and track directions.

In the objective lens support block 26, the objective lens 16, coil 18 for the track actuator, coil 20 of the focus actuator and the reflector 28 for detecting the lens position are disposed.

On this reflector 28, black and white patterns have been created in the track direction, and the lens position sensor 22 has a light emitting section and light receiving section. The light emitting section of the lens position sensor 22 emits light to the reflector 28, and receives reflected light from the reflector 28.

Therefore the light receiving amount of the light receiving section of the lens position sensor 22 changes according to the position of the objective lens support block 26 in the track direction, and the position of the objective lens 16 can be detected by the output level LPOS of the light receiving section.

Both ends 15-1 and 15-2 of the housing 15 limit the movable range of the objective lens support block 26, and also plays a part as a lens cover for protecting the objective lens 16 from the outside.

As FIG. 5 shows, the track servo mechanism (software) of the DSP 42 subtracts the level I at the neutral point of the lens from the level of the lens position signal LPOS using the adder 50, and subtracts this result from the detected track error signal TES using the adder 52, so as to create a track error signal after offset is cancelled.

The track servo controller 54 recognizes the error amount by this track signal after offset is cancelled, and creates a track drive signal for driving the track actuator 18 by a known PID (Proportional Integration Differential) operation and status prediction operation. When the lens is locked, the input of the track error signal TES is disabled, and the track actuator 18 is driven by the output of the adder 50, and the objective lens 16 is locked at the neutral point.

Neutral Point Level Adjustment Method

Figure 6:
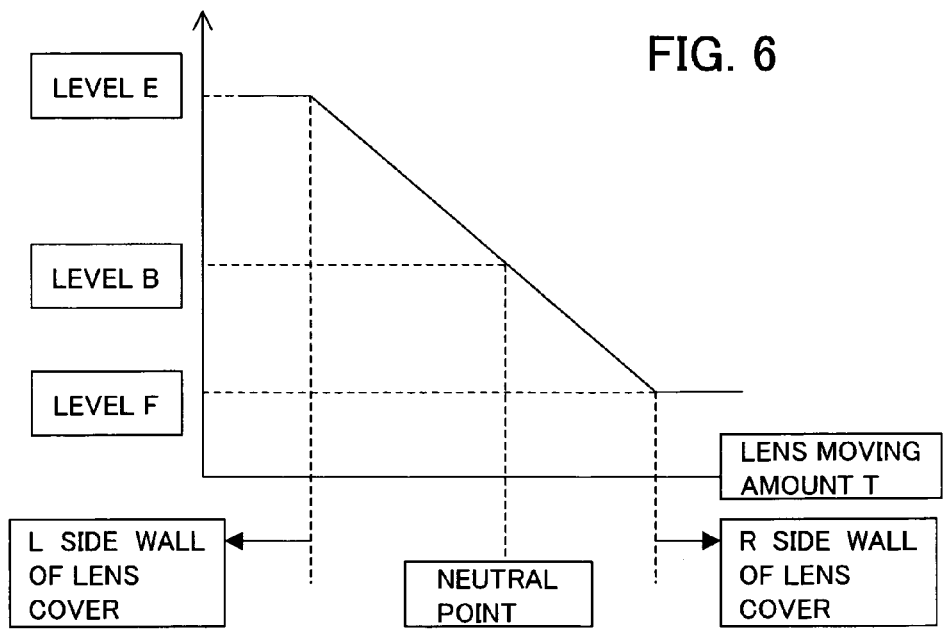
FIG. 6 is a diagram depicting the relationship between the lens position and the output of the lens position sensor in FIG. 2.
Figure 7:
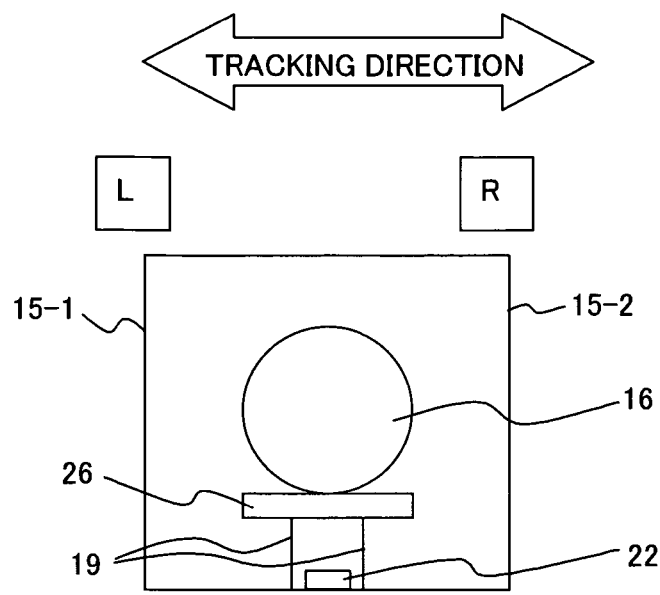
FIG. 7 is a diagram depicting the neutral point of the lens in FIG. 2.
Figure 8:
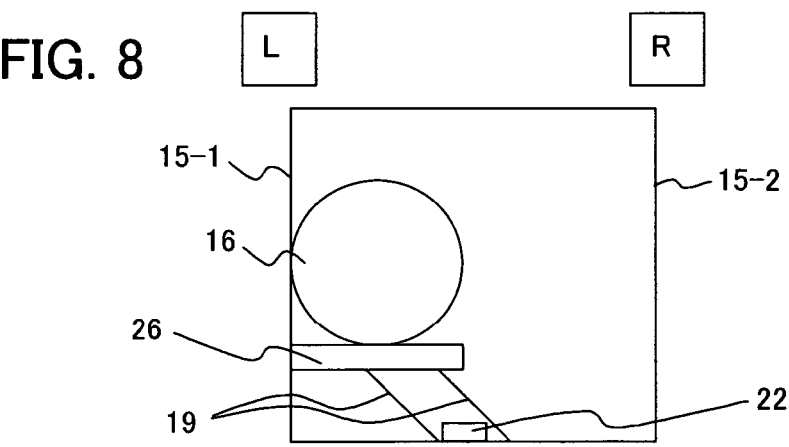
FIG. 8 is a diagram depicting the first measurement operation for the output at the neutral point of the lens in FIG. 2.
Figure 9:
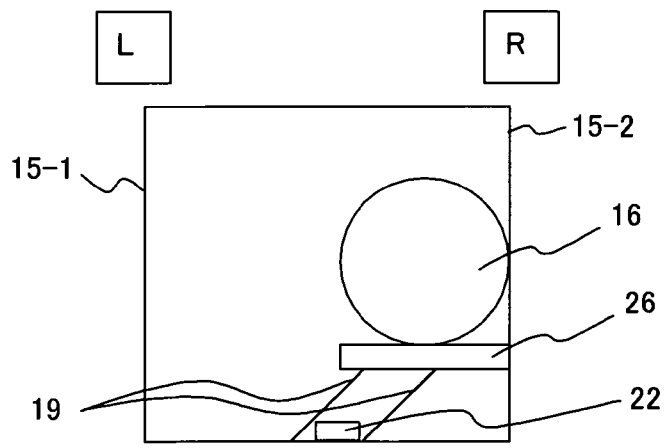
FIG. 9 is a diagram depicting the second measurement operation for the output at the neutral point of the lens in FIG. 2.
Figure 10:
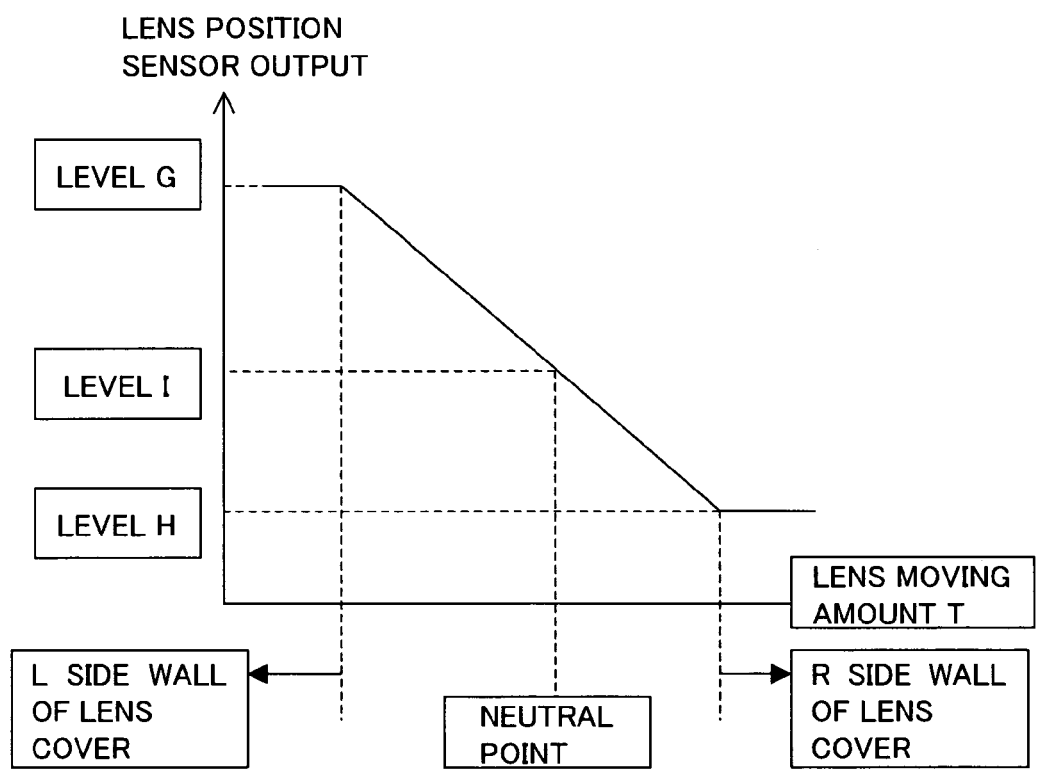
FIG. 10 is a diagram depicting the relationship between the lens position and the output of the lens position sensor during operation.

FIG. 6 is a diagram depicting the relationship of the lens shift amount and the output of the lens position sensor, FIG. 7 to FIG. 9 are diagrams depicting the neutral point level adjustment operation, and FIG. 10 is a diagram depicting the lens shift amount and the output of the lens position sensor when the change with passage of time occurs.

The change with passage of time here refers to the change of the characteristics at an initial status shown in FIG. 6 to the characteristics after the change with passage of time shown in FIG. 10, because of the change of light intensity of the LED section (light emitting section) of the sensor 22 and the change of the light receiving sensitivity caused by the attachment of dust on the detector section of the sensor 22. For example, in the case of a bus power system, where the power is supplied from the host by a bus, a slight drop in the power supply capacity causes a change in the light intensity of the LED, and also causes a change in the light receiving sensitivity.

To calibrate the characteristics change caused by the change with passage of time, the following correction is made when the medium 10 is loaded, or when a certain time has elapsed, or when the environmental temperature changes.

At a reference time, such as in a manufacturing step in a factory, the output level of the lens position sensor 22 when the lens 16 is at a neutral point is measured as shown in FIG. 7, and this level is regarded as level B. Then the lens 16 contacts the lens cover 15-1 at the left end, as shown in FIG. 8, and the output level of the lens position sensor 22 at this time is measured, and this level is regarded as level E.

Then, as FIG. 9 shows, the lens 16 contacts the lens cover 15-2 at the opposite side, and the output level of the lens position sensor 22 at this time is measured, and this level is regarded as level F. FIG. 6 shows the measurement results of these levels.

From the measured levels of level E, level B and level F, the ratio RAT, to indicate the neutral point of the lens, is calculated by the following formula (1). This ratio RAT or level E, level B and level F are recorded in the non-volatile memory 40 as the initial values.

$$RAT = (B-F)/(E-F) \quad (1)$$

Then at the above mentioned measurement for correcting the change with passage of time, the lens 16 contacts the lens cover 15-1 at the left end, as shown in FIG. 8, and the output level of the lens position sensor 22 at this time is measured, and this level is regarded as level G.

Also as FIG. 9 shows, the lens 16 contacts the lens cover 15-2 at the opposite side, and the output level of the lens position sensor 22 at this time is measured, and this level is regarded as level H. FIG. 10 shows the measurement results of these levels.

Here the level I at the neutral point is an unknown because of the change with passage of time, so the calculation of the following formula (2) is executed using these measurement results and the ratio RAT, which indicates the neutral point, recorded at the reference time, and the output level I of the lens position sensor at the neutral point is calculated.

$$I = (G-H)*RAT + H \quad (2)$$

The change with passage of time of the lens position sensor 22 indicates the change of the relationship between the position and the output of the sensor from the status shown in FIG. 6 to the status shown in FIG. 10. In this change, the relationship is E:B:C=G:I:H. Therefore the level I, which was calculated above, indicates the neutral point of the lens 16.

In this way, even if the output characteristic is changed by the change with passage of time of the simple lens position sensor 22, the change can be corrected without any additional circuits. Therefore it is unnecessary to use a complicated differential type sensor, and a drop in device cost and a compact device size can be implemented.

Neutral Point Level Adjustment Processing

Figure 11:
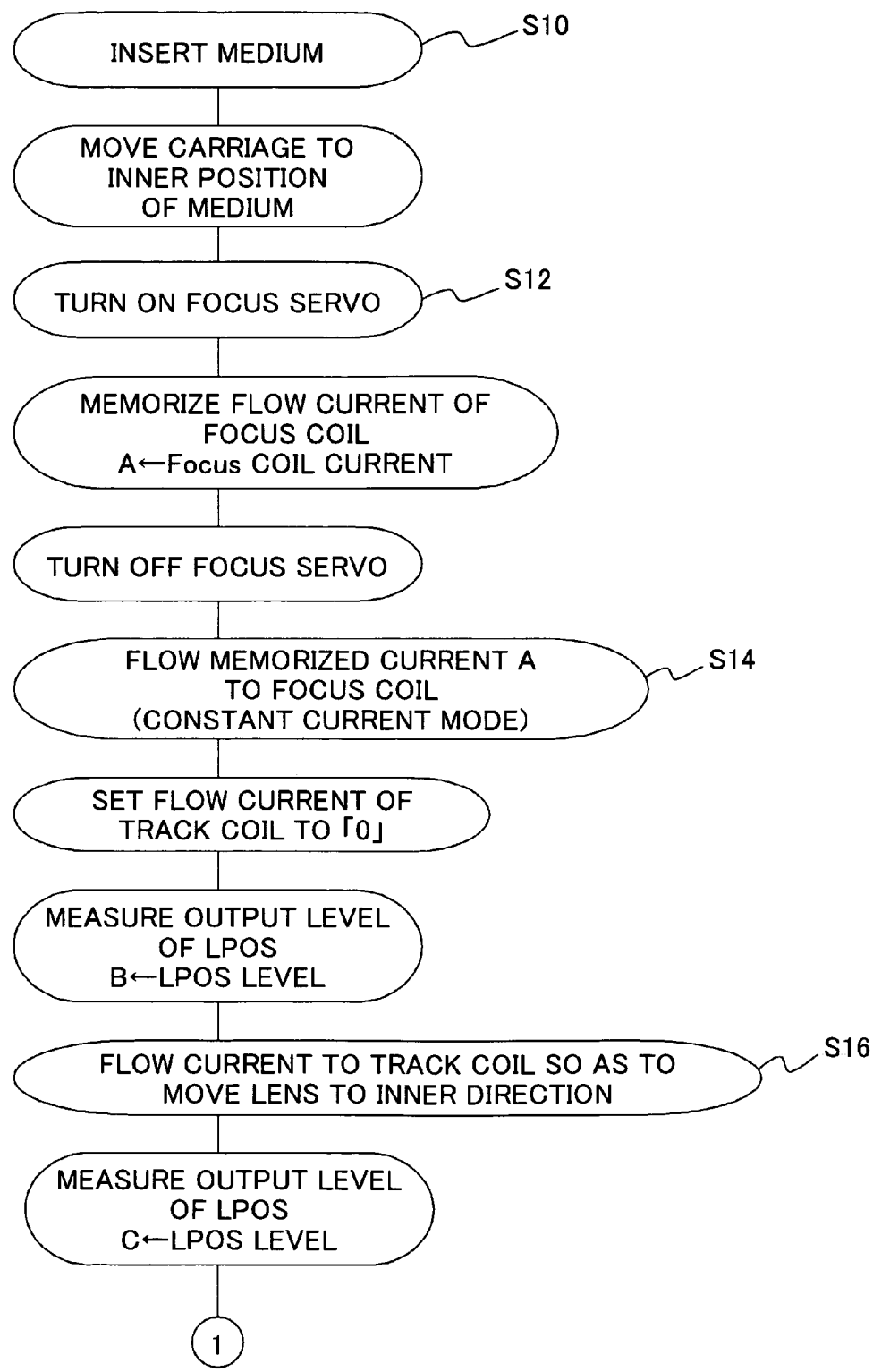
FIG. 11 is a flow chart depicting the first measurement processing for the ratio which indicates the neutral point at the reference time.
Figure 12:
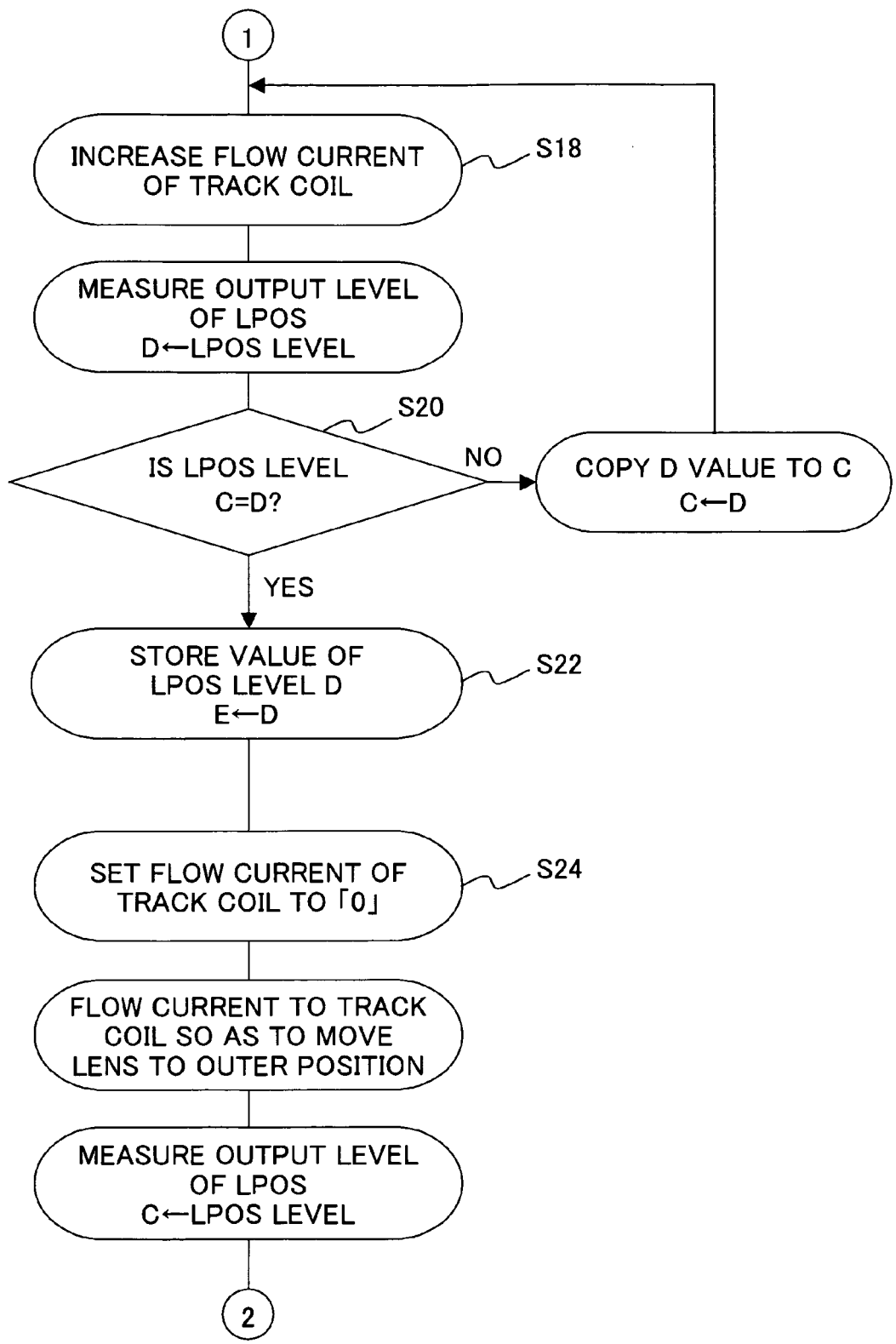
FIG. 12 is a flow chart depicting the second measurement processing for the ratio which indicates the neutral point at the reference time.
Figure 13:
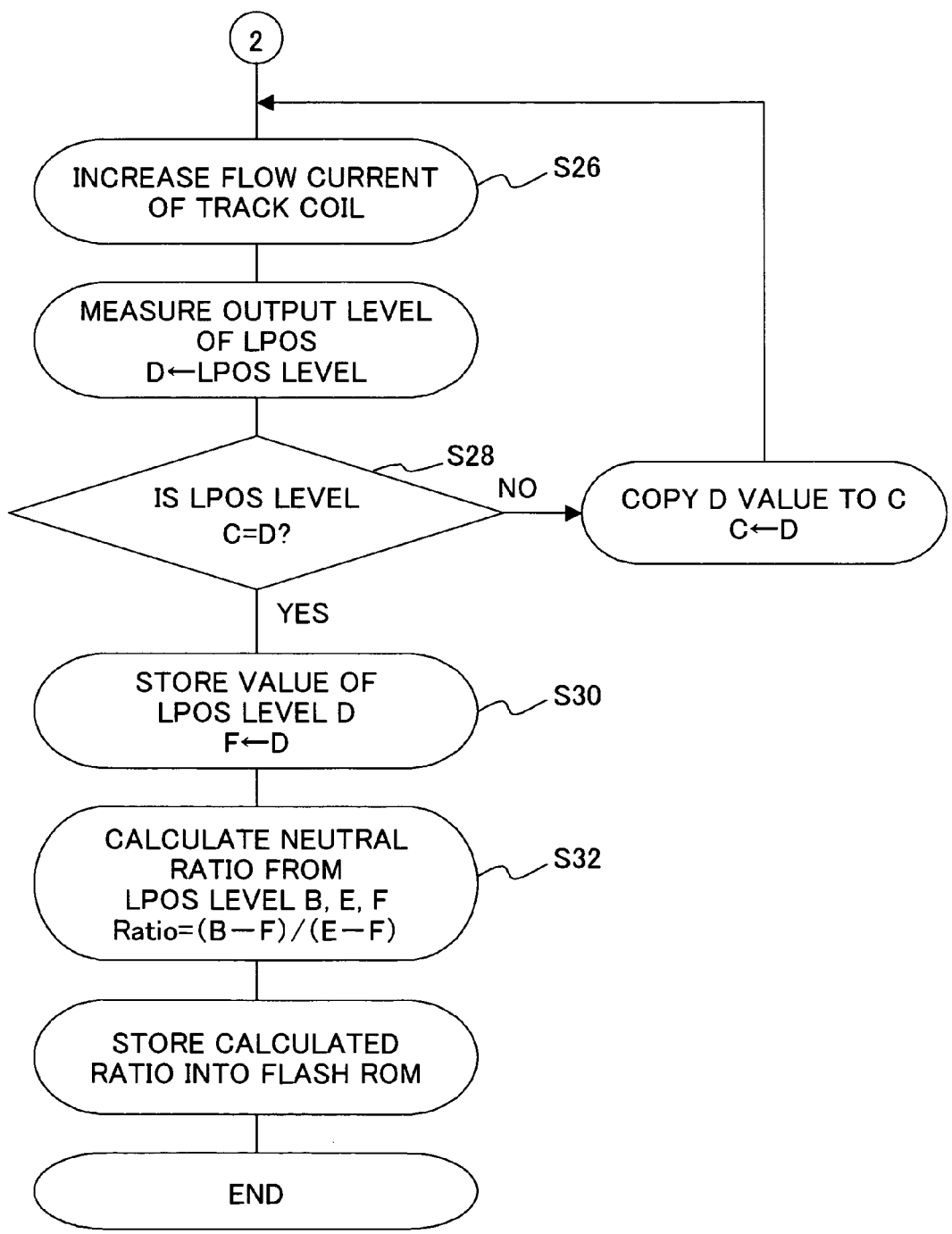
FIG. 13 is a flow chart depicting the third measurement processing for the ratio which indicates the neutral point at the reference time.

Now the neutral point level adjustment processing to be executed by the MPU 38 will be described. At first, the measurement processing for the neutral point ratio in a manufacturing step as a reference time will be described. FIG. 11 to FIG. 13 are flow charts depicting the neutral point ratio measurement processing according to an embodiment of the present invention, and FIG. 14 to FIG. 17 are diagrams depicting the operation thereof.

Now the processing in FIG. 11 and later will be described with reference to FIG. 14 to FIG. 17.

(S10) The MPU 38 detects the insertion of the medium 10, and rotates the spindle motor 12. Then the MPU 38 drives the step motor, which is not illustrated, and moves the carriage (optical head) 14 to the inner track of the medium 10.

(S12) Then the MPU 38 turns ON the focus servo control of the DSP 42, and adjusts the focus position to the focal point. The current A, which flows through the focus coil 20 at this focal point position, is stored. And the MPU 38 turns OFF the focus servo control of the DSP 42.

(S14) The MPU 38 flows the current A at the focal point position into the focus coil 20 via the DSP 42 in focus servo control OFF status. This is the constant current mode. Then the MPU 38 sets the current that flows through the track coil 18 via the DSP 42, to "0". And as described in FIG. 7, the output level of the lens position sensor 22 is measured, and stored as B.

(S16) The MPU 38 flows the current into the track coil 18 so that the objective lens 16 shifts to the inner direction, measures the output level of the lens position sensor 22, and stores it as C.

(S18) The MPU 38 increases the current that flows through the track coil 18 for a predetermined amount via the DSP 42. And the MPU 38 measures the output level of the lens position sensor 22, and stores it as D.

(S20) Comparing the output levels C and D, it is judged whether C=D. If not C=D, C is updated with the value of D. And processing returns to step S18.

(S22) If C=D, this means that the objective lens 16 contacts the inner side, as shown in FIG. 8, so this level D is stored as level E at the contact position at the left end.

(S24) The MPU 38 sets the current that flows through the track coil 18 via the DSP 42, to "0". And the MPU 38 flows the current into the track coil 18 so that the objective lens 16 shifts to the outer direction, measures the output level of the lens position sensor 22, and stores it as C.

(S26) The MPU 38 increases the current that flows through the track coil 18 for a predetermined amount via the DSP 42. And the MPU 38 measures the output level of the lens position sensor 22, and stores it as D.

(S28) Comparing the output levels C and D, it is judged if C=D. If not C=D, C is updated with the value of D. And processing returns to step S26.

(S30) If C=D, this means that the objective lens 16 contacted the outer side, as shown in FIG. 9, so this level D is stored as the level F at the contact position at the right end.

(S32) From the measured level E, level B and level F, the ratio RAT, to indicate the neutral point of the lens, is calculated using the above mentioned formula (1). This ratio RAT is written in the non-volatile memory (flash ROM) 40 as a reference value. And the measurement processing ends.

Figure 14:
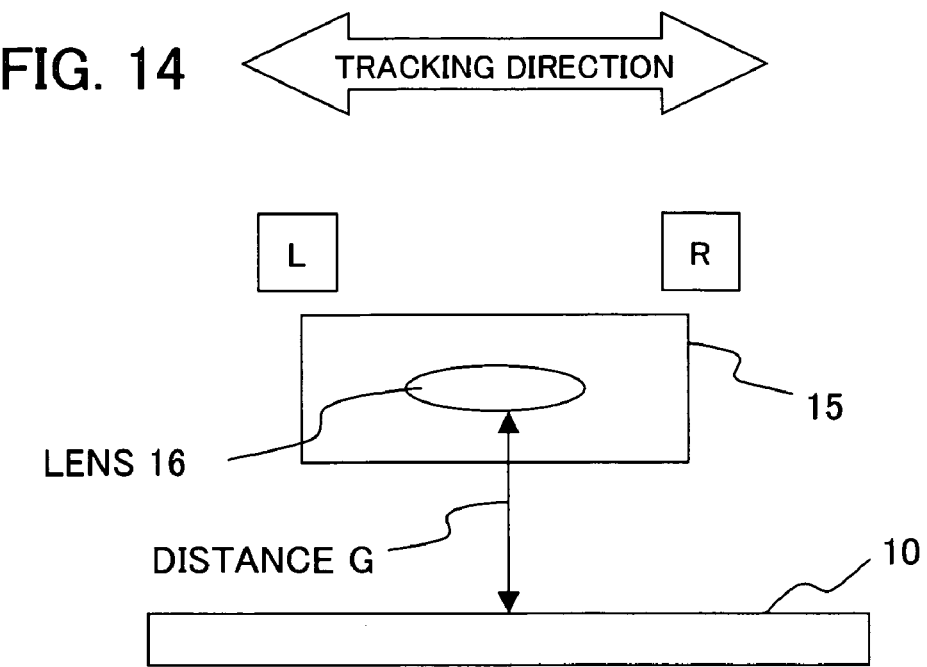
FIG. 14 is a diagram depicting the measurement operation at the focus position in FIG. 11.

In this way, the ratio of the neutral point level is measured. Also when the output of the lens position sensor is measured, the current of the focus coil is set to the constant current in step S14, and the distance G between the lens 16 and the medium 20 is set to be the same as the actual focus adjustment position, as FIG. 14 shows, so the distance G can always be maintained constant.

Figure 15:
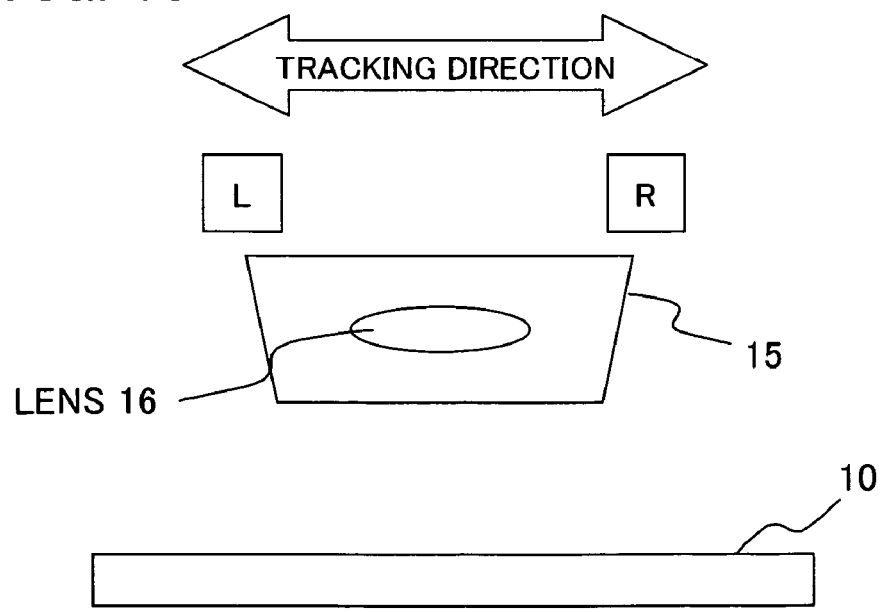
FIG. 15 is another diagram depicting the measurement operation at the focus position in FIG. 11.

Especially in the case when the shape of the lens cover 15 is not uniform and the distance between the lens 16 and the lens cover 15 changes depending on the position of the lens 16 in the focus direction, as shown in FIG. 15, the influence of a measurement error due to the shape of the lens cover becomes small by maintaining the distance G to be constant.

Figure 16:
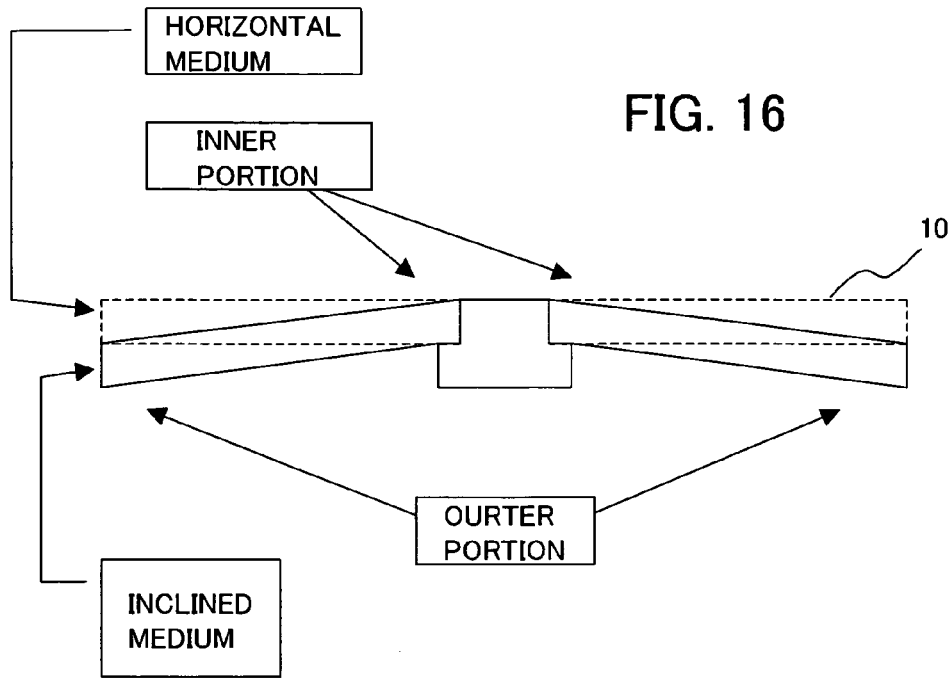
FIG. 16 is a diagram depicting the measurement operation at the inner position in FIG. 11.

Making the lens position in the focus direction to be the same as the focus adjustment position means maintaining the distance from the medium 10 to the lens 16 to be constant. If there are a horizontal medium (dotted line) and a medium which hangs down (solid line) depending on the irregularity of the shape of the medium 10, as shown in FIG. 16, the positions of the media in the focus direction are considerably different in the outer area, but the positional difference is small in the inner area. Therefore, in step S16, by making the measurement with the lens positioned in the inner area, the positional error of the medium 10, due to irregularity, becomes smaller, and a measurement with a higher precision becomes possible.

Figure 17:
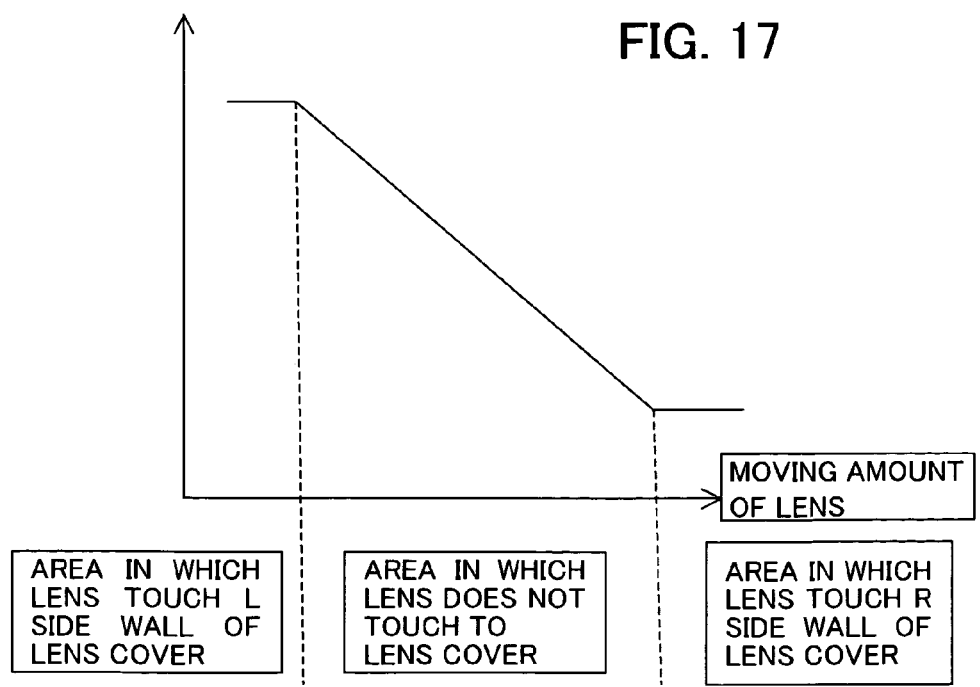
FIG. 17 is a diagram depicting the lens abutting operation in FIG. 11 to FIG. 13.

Also as the relational diagram between the lens position and the output of the lens position sensor in FIG. 17 shows, the lens position and the output of the lens position sensor are in proportion to each other when the lens 16 does not contact the lens cover 15, but in the status where the lens 16 contacts the lens cover 15, the output of the lens position sensor 22 becomes constant regardless the shift amount of the lens.

By detecting the stop of change of the output of the lens position sensor in steps S20 and S28, the contact of the lens 16 to the wall of the lens cover 15 can be detected based on this output characteristic. In other words, no special sensors are required.

By moving the lens 16 while checking if the lens 16 contacts the wall of the lens cover 15, the current required for contacting the lens 16 to the wall of the lens cover 15 can be minimized so that power consumption can be decreased, and damage to the lens actuator 18 caused by over current can be prevented. And an unexpected status where the lens 16, which is supposed to be in contact with lens cover 15, is actually not in contact can be detected.

When the output of the lens position sensor at the lens neutral point is measured at the measurement of the initial status in the beginning, it must first be confirmed that the lens must be at the neutral position. For this, if the device is maintained in a horizontal status when the above measurement is performed, the lens 16 naturally comes to the neutral point by the plate springs 19 for supporting the lens 16 in FIG. 3 and FIG. 4, therefore no special method for detecting the neutral point is required.

Figure 18:
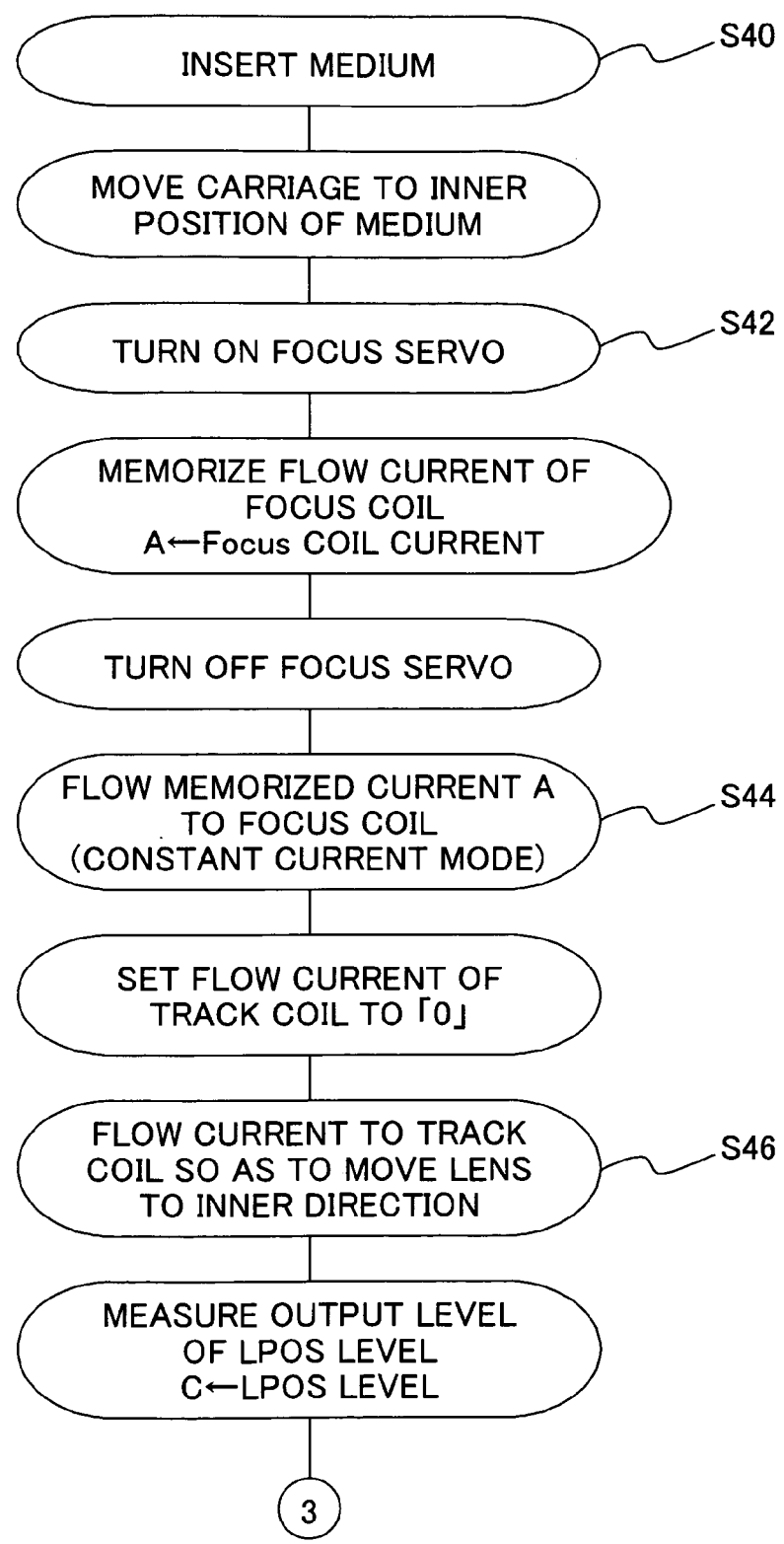
FIG. 18 is a flow chart depicting the first measurement processing for the neutral point level when the device is being used.
Figure 19:
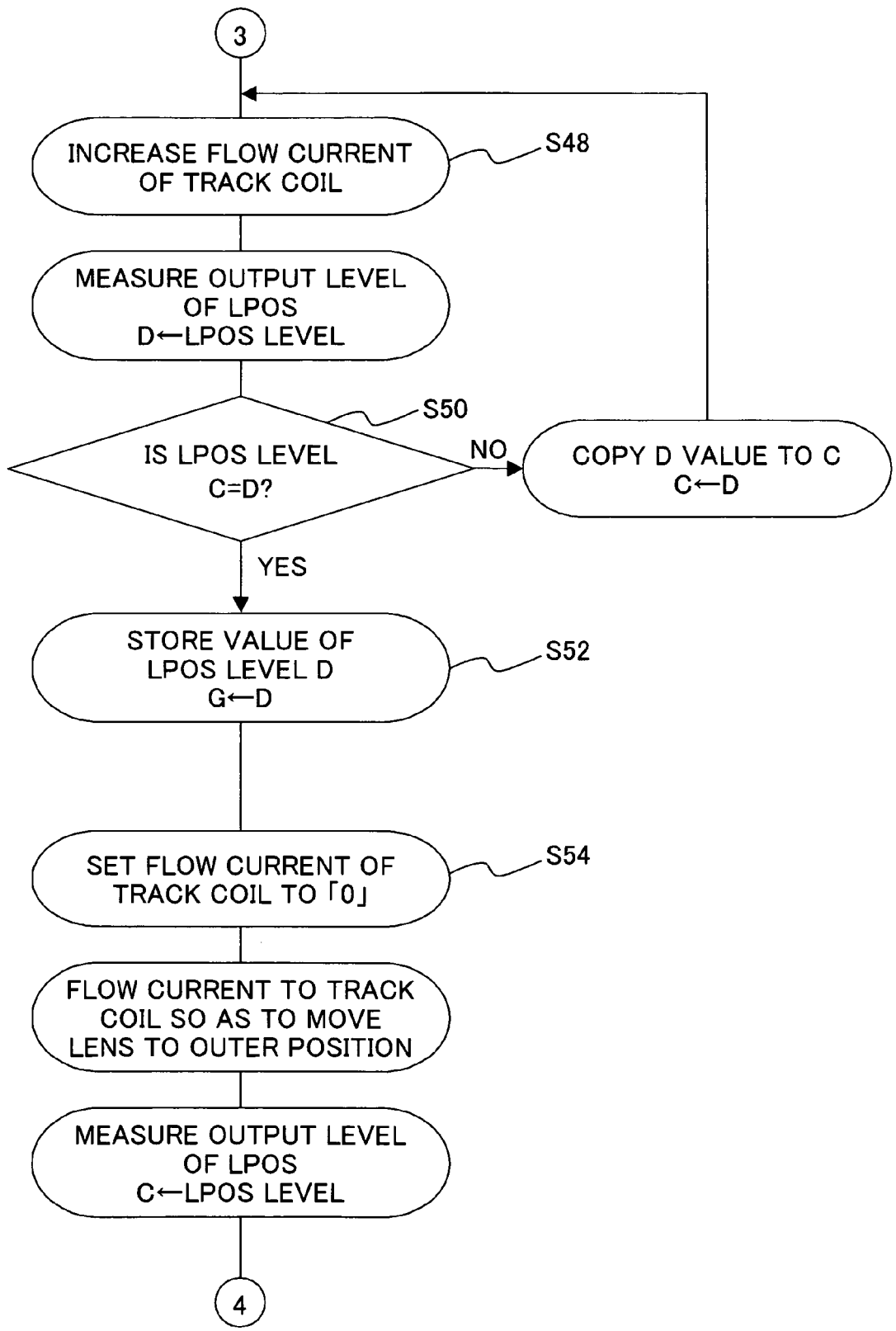
FIG. 19 is a flow chart depicting the second measurement processing for the neutral point level when the device is being used.
Figure 20:
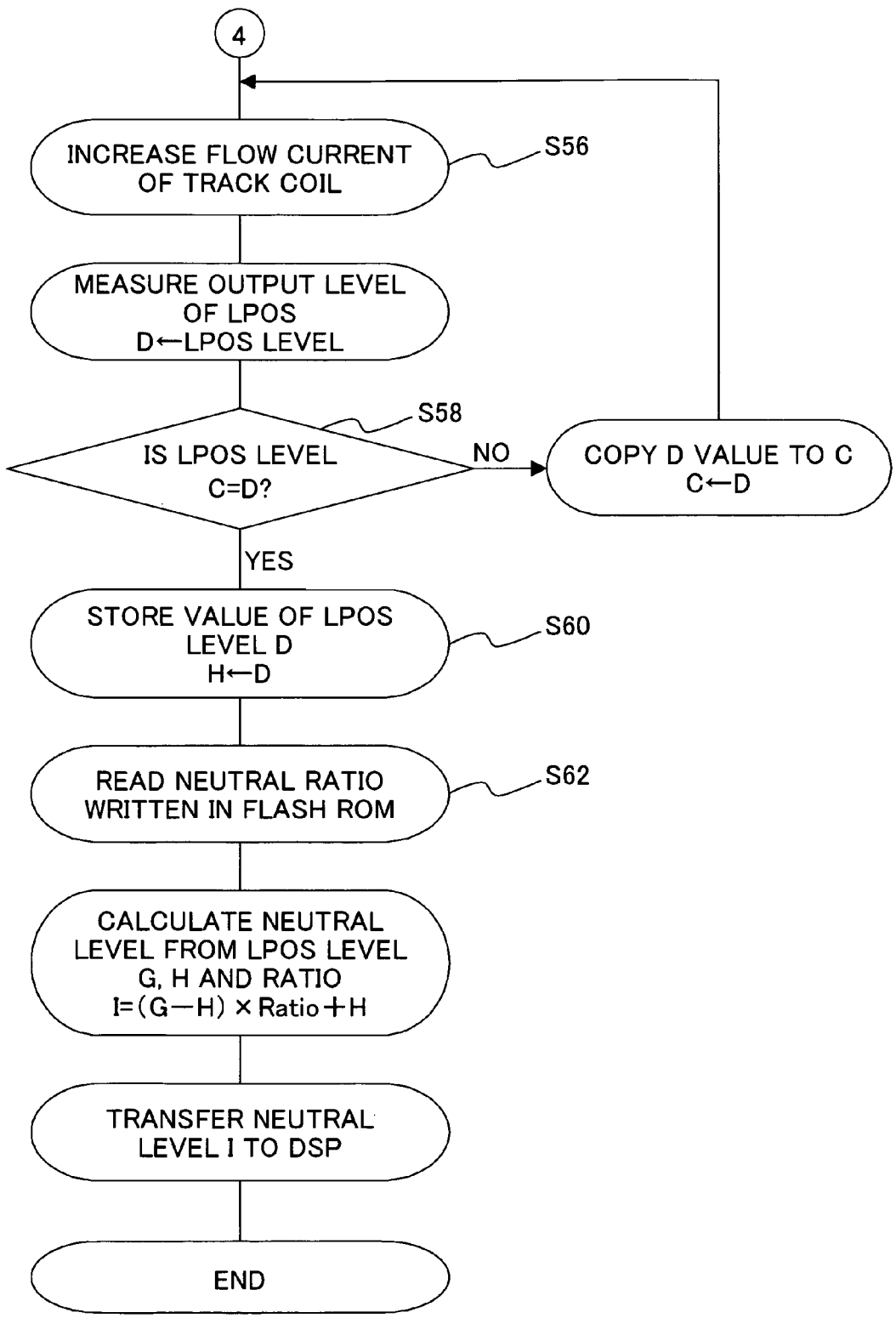
FIG. 20 is a flow chart depicting the third measurement processing for the neutral point level when the device is being used.
Figure 21:
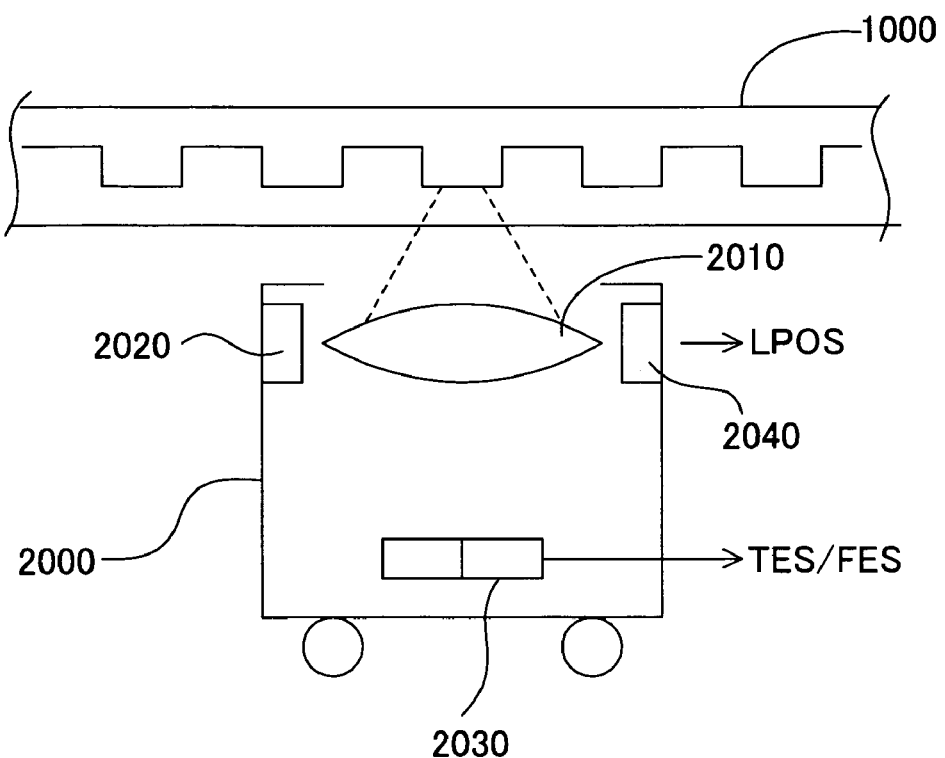
FIG. 21 is a diagram depicting a conventional optical head and optical disk.
Figure 22:
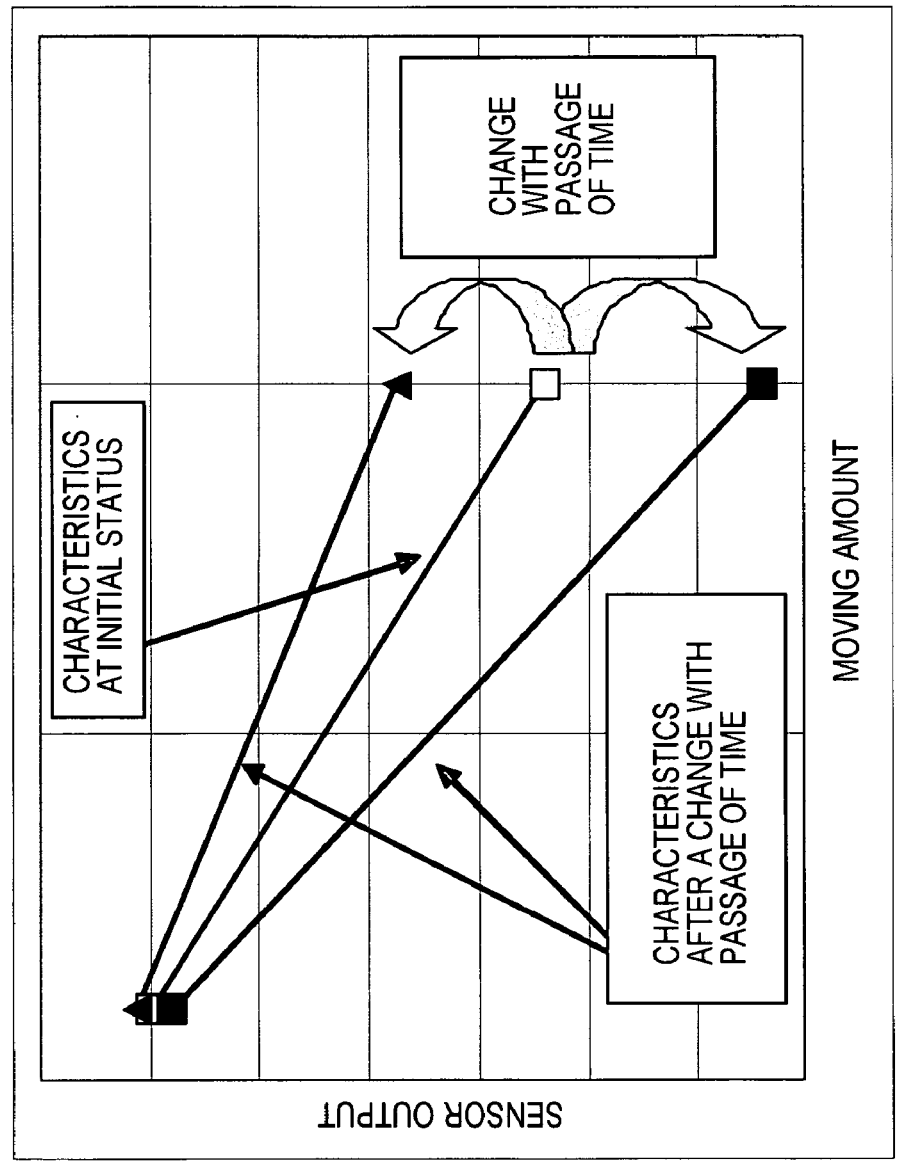
FIG. 22 is a diagram depicting the change of output of a conventional lens position sensor.
Figure 23:
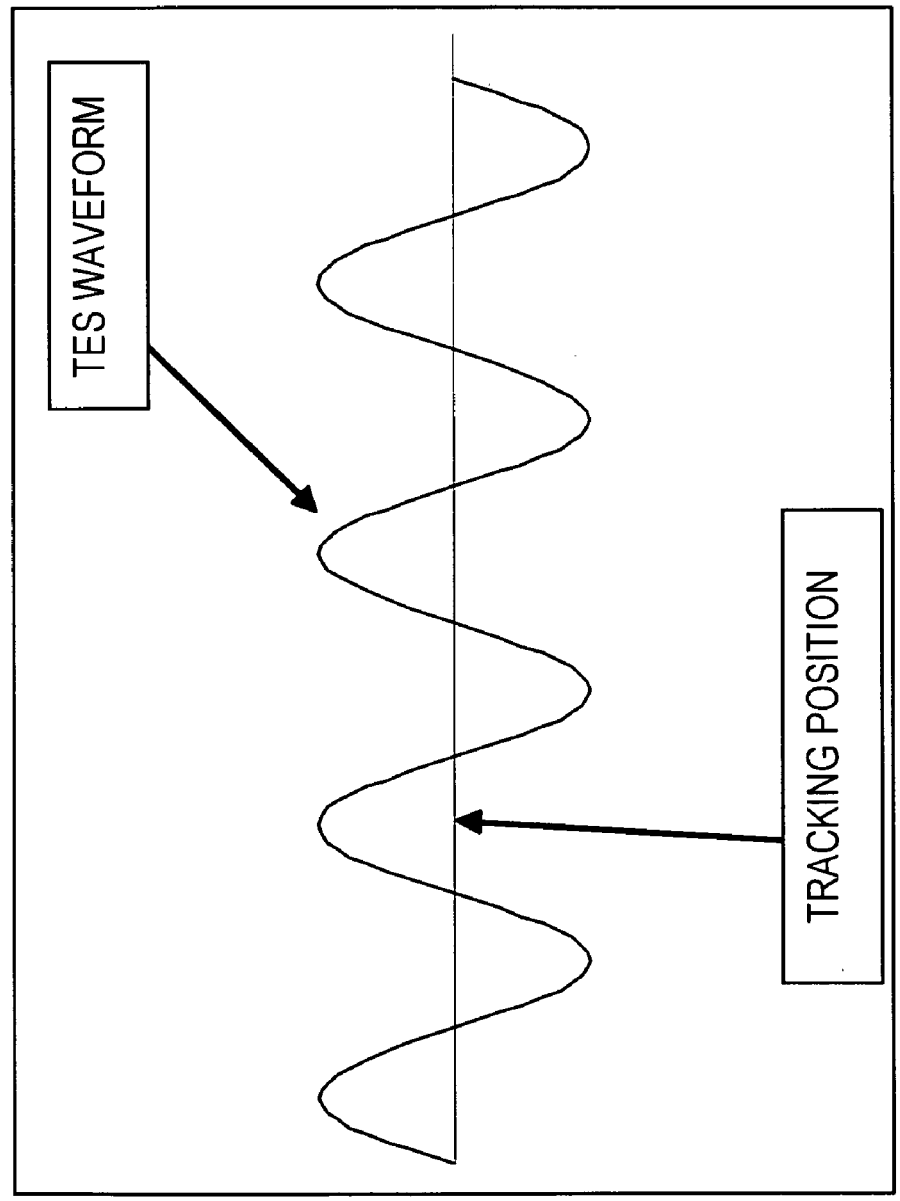
FIG. 23 is a diagram depicting a conventional track error signal.
Figure 24:
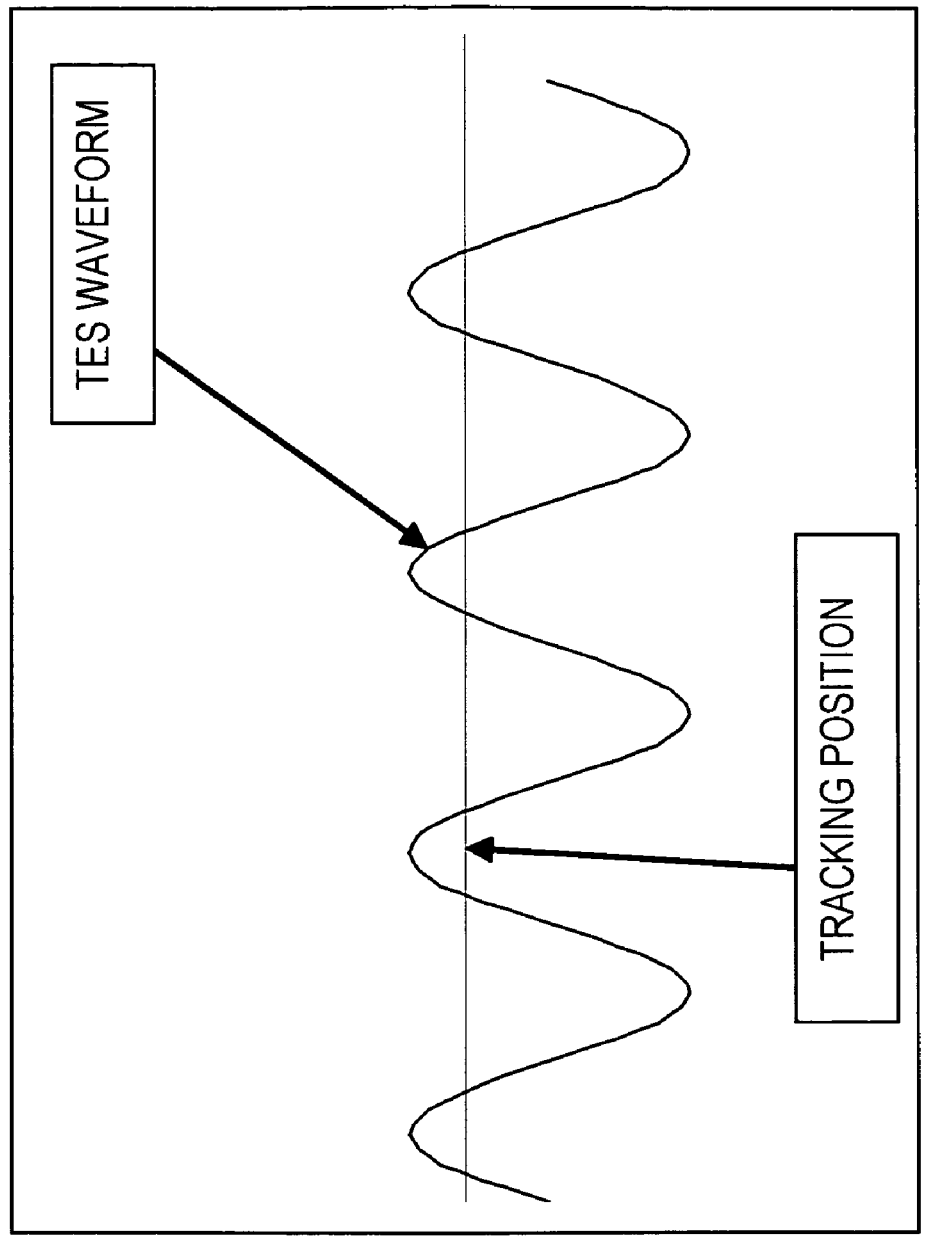
FIG. 24 is a diagram depicting a conventional track error signal and offset.

Now the measurement processing for the level at the neutral point at normal usage will be described. FIG. 18 to FIG. 20 are flow charts depicting the measurement processing for the neutral point level according to an embodiment of the present invention.

Now the measurement processing in FIG. 18 and later will be described with reference to FIG. 14 to FIG. 17.

(S40) The MPU 38 detects the insertion of the medium 10, and rotates the spindle motor 12. Then the MPU 38 drives the step motor, which is not illustrated, and moves the carriage (optical head) 14 to the inner track of the medium 10.

(S42) Then the MPU 38 turns ON the focus servo control of the DSP 42, and adjusts the focus position to the focal point. The current A, which flows through the focus coil 20 at this focal point position, is stored. And the MPU 38 turns OFF the focus servo control of the DSP 42.

(S44) The MPU 38 flows the current A at the focal point position into the focus coil 20 via the DSP 42 in focus servo control OFF status. This is the constant current mode. Then the MPU 38 sets the current that flows through the track coil 18 via the DSP 42, to "0".

(S46) The MPU 38 flows the current into the track coil 18 so that the objective lens 16 shifts to the inner direction, measures the output level of the lens position sensor 22, and stores it as C.

(S48) The MPU 38 increases the current that flows through the track coil 18 for a predetermined amount via the DSP 42. And the MPU 38 measures the output level of the lens position sensor 22, and stores it as D.

(S50) Comparing the output levels C and D, it is judged whether C=D. If not C=D, C is updated with the value of D. And processing returns to step S48.

(S52) If C=D, this means that the objective lens 16 contacts the inner side, as shown in FIG. 8, so this level D is stored as level G at the contact position at the left end.

(S54) The MPU 38 sets the current that flows through the track coil 18 via the DSP 42, to "0". And the MPU 38 flows the current into the track coil 18 so that the objective lens 16 shifts to the outer direction, measures the output level of the lens position sensor 22, and stores it as C.

(S56) The MPU 38 increases the current that flows through the track coil 18 for a predetermined amount via the DSP 42. And the MPU 38 measures the output level of the lens position sensor 22, and stores it as D.

(S58) Comparing the output levels C and D, it is judged if C=D. If not C=D, C is updated with the value of D. And processing returns to step S56.

(S60) If C=D, this means that the objective lens 16 contacted the outer side, as shown in FIG. 9, so this level D is stored as the level H at the contact position at the right end.

(S62) The MPU 38 reads the ratio RAT at the neutral point written in flash ROM (non-volatile memory) 40, and calculates the level I to be the neutral point of the lens from the measured level G, level H and the ratio RAT, using the above mentioned formula (2). The MPU 38 transfers this level I to the DSP 42 for lens lock, and the offset correction of the track error signal. And the level measurement process ends.

In this way, the change of the neutral point level caused by the change with passage of time is measured. Just like FIG. 14, when the output of the lens position sensor is measured, the current of the focus coil is set to constant current and the distance G between the lens 16 and the medium 20 is set to be the same as the actual focus adjustment position, then the distance G can always be maintained constant.

Also as FIG. 15 shows, in the case when the shape of the lens cover 15 is not uniform and so the distance between the lens 16 and the lens cover 15 changes depending on the position of the lens 16 in the focus direction, the influence of a measured error due to the shape of the lens cover becomes small by maintaining the distance G to be constant.

Making the lens position in the focus direction to be the same as the focus adjustment position means maintaining the distance from the medium 10 to the lens 16 to be constant. If there are a horizontal medium (dotted line) and a medium, which is hung down (solid line) depending on the irregularity of the shape of the medium 10, as shown in FIG. 16, the position of the media in the focus direction are considerably different in the outer area, but the positional difference is small in the inner area. Therefore, by making the measurement with the lens positioned at the inner area, a positional error of the medium 10 due to the irregularity becomes smaller, and measurement with a higher precision becomes possible.

Also as the relational diagram in FIG. 17 shows, the lens position and the output of the lens position sensor are in proportion to each other when the lens 16 does not contact the lens cover 15, but in the status where the lens 16 contacts the lens cover 15, the output of the lens position sensor 22 becomes constant regardless the shift amount of the lens.

By detecting the stop of the change of the output of the lens position sensor, contact of the lens 16 to the wall of the lens cover 15 can be detected based on these output characteristics. In other words, no special sensors are required.

By moving the lens 16 while checking if the lens 16 contact the wall of the lens cover 15, the current required for contacting the lens 16 to the wall of the lens cover 15 can be minimized, so power consumption can be decreased, and damage to the lens actuator 18 caused by over current can be prevented. And an unexpected status where the lens 16, which is supposed to be in contact with the lens cover 15, is actually not in contact can be detected.

Other Embodiments

In the above embodiment, a magneto-optical disk device was used as an example to describe the optical disk device, but the present invention can be applied to other optical disk devices, such as CD and DVD. Also the external shape of the optical disk can not only be circular but also can have other shapes, such as rectangular.

An optical head, where the optical system and optical drive system are integrated, was described above, but the present invention can be applied to a separate type of optical head where the optical system is fixed and the optical drive system is movable. Also an example of the case when the level measurement processing in FIG. 18 and later is executed when the medium is loaded was described above, but the level measurement processing may be executed when a predetermined time has elapsed or when the change of the environmental temperature is detected.

Since the neutral point level of the objective lens can be adjusted using a lens position sensor with a simple configuration, the lens position can be detected stably against the change with passage of time, and a compact optical disk device using a lens position sensor with a simple configuration can be implemented at low cost. The present invention in particular contributes to the popularization of portable type optical disk devices.

What is claimed is:

1. The output adjustment method for a lens position sensor of an optical disk device for detecting a position of an objective lens that can move in a track direction of an optical disk, comprising the steps of:
    measuring an output of said lens position sensor when said objective lens positions at a neutral point and the output of said lens position sensor when said objective lens moves to left and right movable limit positions at a reference time;
    calculating an output ratio at said neutral point to be a reference from said measured outputs when said objective lens moves to the left and right movable limit positions;
    measuring the output of said lens position sensor when said objective lens moves to the left and right movable limit positions during usage of the device; and
    calculating the output level of said lens position sensor corresponding to said neutral point when said objective lens moves to the left and right movable limit positions during usage from said measured output and said calculated output ratio at said neutral point, and
    wherein said measurement step further comprises a step of measuring the output of said lens position sensor with a focus adjustment position of said objective lens secured.

2. The output adjustment method for a lens position sensor of an optical device according to claim 1, wherein said measurement step comprises a step of measuring the output of said lens position sensor when said objective lens abuts against the left and right lens cover for limiting a movable range of said objective lens.

3. The output adjustment method for a lens position sensor of an optical disk device according to claim 1, wherein said measurement step further comprises:
    a step of monitoring the output of said lens position sensor while moving said objective lens; and
    a step of detecting the fact that said objective lens has abutted against the left and right lens cover for limiting a movable range of said objective lens by said monitoring result.

4. The output adjustment method for a lens position sensor of an optical disk device according to claim 1, wherein said measurement step further comprises a step of measuring the output of said lens position sensor with said objective lens positioned at an inner track position of said optical disk.

5. The output adjustment method for a lens position sensor of an optical disk device according to claim 1, wherein said measurement step during usage of the device is executed when said optical disk is inserted into said optical disk device.

6. The output adjustment method for a lens position sensor of an optical disk device according to claim 1, wherein said measurement step further comprises a step of moving said objective lens to the movable limit position of said objective lens by driving a track actuator for moving said objective lens.

7. The output adjustment method for a lens position sensor of an optical disk device according to claim 1, wherein said measurement step during usage of the device is executed when at least one of the fact that a predetermined time has elapsed and the fact that the environmental temperature has changed is detected.

8. The output adjustment method for a lens position sensor of an optical disk device,
    for detecting a position of an objective lens that can move in a track direction of an optical disk, comprising the steps of:
    measuring an output of said lens position sensor when said objective lens positions at a neutral point and the output of said lens position sensor when said objective lens moves to left and right movable limit positions at a reference time;
    calculating an output ratio at said neutral point to be a reference from said measured outputs when said objective lens moves to the left and right movable limit positions;
    measuring the output of said lens position sensor when said objective lens moves to the left and right movable limit positions during usage of the device; and
    calculating the output level of said lens position sensor corresponding to said neutral point when said objective lens moves to the left and right movable limit positions during usage from said measured output and said calculated output ratio at said neutral point, and wherein said measurement step at said reference time further comprises a step of measuring the output of said lens position sensor with said optical disk device placed in a horizontal status.

9. The optical disk device for at least reading an optical disk by moving an optical head having an objective lens, that can move in a track direction, in a track direction of said optical disk, comprising:

a position sensor installed in said optical head for detecting a position of said objective lens; and a control unit for controlling said optical head according to the output of said position sensor, wherein said control unit measures an output of said position sensor when said objective lens positions at a neutral point and outputs of said position sensor when said objective lens moves to left and right movable limit positions at a reference time, calculates and stores an output ratio at said neutral point to be a reference from said measured outputs when said objective lens moves to the left and right movable limit positions, measures the output of said position sensor when said objective lens moves to the left and right movable limit positions during usage of the device, and calculates the output level of said position sensor corresponding to said neutral point from said measured output when said objective lens moves to the left and right movable limit positions during usage and said calculated output ratio at said neutral point for using during usage of the device, and wherein said control unit measures the output of said position sensor with a focus adjustment position of said objective lens secured.

10. The optical disk device according to claim 9, wherein said optical head further comprises left and right lens covers for limiting a movable range of said objective lens, and said control unit measures the output of said position sensor when said objective lens abuts against said left and right lens covers.

11. The optical disk device according to claim 9, wherein said control unit monitors the output of said position sensor while moving said objective lens and detects the fact that said objective lens has abutted against the left and right lens covers for limiting a movable range of said objective lens.

12. The optical disk device according to claim 9, wherein said control unit measures the output of said position sensor with said objective lens positioned at an inner track position of said optical disk.

13. The optical disk device according to claim 9, wherein, during usage of the device, said control unit executes said measurement when said optical disk is inserted.

14. The optical disk device according to claim 9, wherein said control unit moves said objective lens to the movable limit position of said objective lens by driving a track actuator for moving said objective lens.

15. The optical disk device according to claim 9, wherein, during usage of the device, said control unit executes said measurement when at least one of the fact that a predetermined time has elapsed and the fact that the environmental temperature has changed is detected.

16. The optical disk device according to claim 9, wherein said control unit corrects an offset of a track error signal for indicating an error of said objective lens in a track direction on the basis of the output level of said position sensor corresponding to said neutral point and the output level of said position sensor during usage of the device.

17. The optical disk device for at least reading an optical disk by moving an optical head having an objective lens, that can move in a track direction, in a track direction of said optical disk, comprising:

a position sensor installed in said optical head for detecting a position of said objective lens; and a control unit for controlling said optical head according to the output of said position sensor, wherein said control unit measures an output of said position sensor when said objective lens positions at a neutral point and outputs of said position sensor when said objective lens moves to left and right movable limit positions at a reference time, calculates and stores an output ratio at said neutral point to be a reference from said measured outputs when said objective lens moves to the left and right movable limit positions, measures the output of said position sensor when said objective lens moves to the left and right movable limit positions during usage of the device, and calculates the output level of said position sensor corresponding to said neutral point from said measured output when said objective lens moves to the left and right movable limit positions during usage and said calculated output ratio at said neutral point for using during usage of the device, and wherein said control unit measures the output of said position sensor with said optical disk device placed in a horizontal status at said reference time.

18. The optical disk device for at least reading an optical disk by moving an optical head having an objective lens, that can move in a track direction, in a track direction of said optical disk, comprising:

a position sensor installed in said optical head for detecting a position of said objective lens; and a control unit for controlling said optical head according to the output of said position sensor, wherein said control unit measures an output of said position sensor when said objective lens positions at a neutral point and outputs of said position sensor when said objective lens moves to left and right movable limit positions at a reference time, calculates and stores an output ratio at said neutral point to be a reference from said measured outputs when said objective lens moves to the left and right movable limit positions, measures the output of said position sensor when said objective lens moves to the left and right movable limit positions during usage of the device, and calculates the output level of said position sensor corresponding to said neutral point from said measured output when said objective lens moves to the left and right movable limit positions during usage and said calculated output ratio at said neutral point for using during usage of the device, and wherein said control unit locks said objective lens depending on the output level of said position sensor corresponding to said neutral point and the output level of said position sensor during the usage of the device.

* * * * *